(12) United States Patent
Innes

(10) Patent No.: US 10,277,578 B2
(45) Date of Patent: Apr. 30, 2019

(54) SECURING NETWORK ACTIVITY MANAGED BY OPERATING SYSTEMS

(71) Applicant: Citrix Systems, Inc., Fort Lauderdale, FL (US)

(72) Inventor: Andrew Carnegie Innes, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 144 days.

(21) Appl. No.: 14/986,971

(22) Filed: Jan. 4, 2016

(65) Prior Publication Data

US 2016/0197909 A1    Jul. 7, 2016

Related U.S. Application Data

(60) Provisional application No. 62/099,774, filed on Jan. 5, 2015.

(51) Int. Cl.

| | |
|---|---|
| *H04L 9/00* | (2006.01) |
| *H04L 29/06* | (2006.01) |
| *H04L 29/08* | (2006.01) |
| *H04W 12/06* | (2009.01) |
| *H04W 12/02* | (2009.01) |

(52) U.S. Cl.
CPC ...... *H04L 63/0807* (2013.01); *H04L 63/0435* (2013.01); *H04L 63/0815* (2013.01); *H04L 67/2842* (2013.01); *H04W 12/06* (2013.01); *H04L 63/0272* (2013.01); *H04L 63/0281* (2013.01); *H04L 67/02* (2013.01); *H04L 67/146* (2013.01); *H04W 12/02* (2013.01)

(58) Field of Classification Search
CPC .................................................. H04L 63/0807
USPC ............................................................ 726/6
See application file for complete search history.

(56) References Cited

U.S. PATENT DOCUMENTS

| | | | | |
|---|---|---|---|---|
| 6,606,663 | B1 * | 8/2003 | Liao | G06Q 20/20 |
| | | | | 705/25 |
| 7,478,434 | B1 * | 1/2009 | Hinton | G06F 17/3089 |
| | | | | 726/27 |
| 7,979,802 | B1 * | 7/2011 | Appelman | G06Q 10/107 |
| | | | | 715/752 |
| 2011/0154019 | A1 * | 6/2011 | Wang | H04L 63/0281 |
| | | | | 713/153 |

(Continued)

OTHER PUBLICATIONS

Apr. 5, 2016 (WO) International Search Report and Written Opinion—App. PCT/US2016/012120.

*Primary Examiner* — Christopher J Brown
(74) *Attorney, Agent, or Firm* — Banner & Witcoff, Ltd.

(57) ABSTRACT

Methods and systems are disclosed for providing approaches to receiving, by an enterprise framework device from an application executing on a computing device, a first request associated with accessing an enterprise resource and generating, by the data proxy device, a ticketed URL that is associated with resource device communications related to the first request. The methods and systems may include receiving, by the data proxy device from the operating system, a second request addressed to the ticketed URL, transmitting, by the data proxy device to the operating system, based on the second request addressed to the ticketed URL, a resource device response, and transmitting, by the enterprise framework device to the application, the resource device response.

20 Claims, 6 Drawing Sheets

(56) References Cited

U.S. PATENT DOCUMENTS

| | | |
|---|---|---|
| 2012/0210415 A1* | 8/2012 | Somani ............... H04L 63/0884 |
| | | 726/9 |
| 2014/0109174 A1 | 4/2014 | Barton et al. |
| 2014/0208100 A1 | 7/2014 | Kendall |
| 2014/0229520 A1* | 8/2014 | Scott ....................... H04L 45/00 |
| | | 709/202 |
| 2014/0331297 A1 | 11/2014 | Innes et al. |
| 2016/0026717 A1* | 1/2016 | Kelsey .............. G06F 17/30867 |
| | | 707/754 |

* cited by examiner

US 10,277,578 B2

SECURING NETWORK ACTIVITY MANAGED BY OPERATING SYSTEMS

CROSS-REFERENCE TO RELATED APPLICATION

This application claims priority to U.S. Provisional Patent Application Ser. No. 62/099,774, filed Jan. 5, 2015, and entitled "SECURING NETWORK ACTIVITY MANAGED BY OPERATING SYSTEMS," the disclosure of which is incorporated by reference herein in its entirety and made part hereof.

FIELD

Aspects of the disclosure generally relate to computing hardware and computer software. In particular, one or more aspects of the disclosure relate to mobile devices that provide enhanced security for network activity managed by an operating system via an enterprise application.

BACKGROUND

Mobile devices are becoming increasingly popular. More and more people are using mobile devices in personal and business settings for a variety of purposes. Improving battery life and minimizing wear and tear on the internal components of mobile devices is at the forefront of the minds of users. Thus, there is a need to develop methods that improve battery life and minimize wear and tear while not decreasing the computing efficiency of the mobile device.

SUMMARY

As a general introduction to the subject matter described in more detail below, aspects described herein are directed to having operating systems make provisions for applications to delegate or offload certain types of network activity to the operating system to, for example, improve battery life of a mobile device.

One or more aspects of the disclosure provide for a method that may include receiving, by an enterprise framework device from an application executing on a computing device, a first request associated with accessing an enterprise resource, transmitting, by the enterprise framework device, the first request to a data proxy device via a foreground application programming interface of an operating system executing on the computing device, and transmitting, by the data proxy device, the first request to an enterprise resource device. The method may include generating, by the data proxy device, a ticketed URL, the ticketed URL being associated with resource device communications related to the first request for the enterprise resource, transmitting, by the data proxy device, the ticketed URL to the enterprise framework device, transmitting, by the enterprise framework device, the ticketed URL to the operating system, and receiving, by the data proxy device from the operating system, a second request addressed to the ticketed URL. The method may include transmitting, by the data proxy device to the operating system, based on the second request addressed to the ticketed URL, a resource device response related to the first request for the enterprise resource device, retrieving, by the enterprise framework device from the operating system, the resource device response related to the first request for the enterprise resource, and transmitting, by the enterprise framework device to the application, the resource device response related to the first request for the enterprise resource.

One or more aspects of the disclosure provide for a system that includes at least one processor; and at least one memory storing instructions that, when executed by the at least one processor, cause the system to perform one or more steps. The steps the system may perform may include receiving, by an enterprise framework device from an application executing on a computing device, a first request associated with accessing an enterprise resource, transmitting, by the enterprise framework device, the first request to a data proxy device via a foreground application programming interface of an operating system executing on the computing device, and transmitting, by the data proxy device, the first request to an enterprise resource device. The steps may include generating, by the data proxy device, a ticketed URL, the ticketed URL being associated with resource device communications related to the first request for the enterprise resource, transmitting, by the data proxy device, the ticketed URL to the enterprise framework device, transmitting, by the enterprise framework device, the ticketed URL to the operating system, and receiving, by the data proxy device from the operating system, a second request addressed to the ticketed URL. The steps may include transmitting, by the data proxy device to the operating system, based on the second request addressed to the ticketed URL, a resource device response related to the first request for the enterprise resource device, retrieving, by the enterprise framework device from the operating system, the resource device response related to the first request for the enterprise resource, and transmitting, by the enterprise framework device to the application, the resource device response related to the first request for the enterprise resource.

One or more aspects of the disclosure provide for one or more non-transitory computer-readable storage media having instructions stored thereon, that when executed by one or more processors, may cause the one or more processors to perform steps. The steps that the one or more processors perform may include receiving, by an enterprise framework device from an application executing on a computing device, a first request associated with accessing an enterprise resource, transmitting, by the enterprise framework device, the first request to a data proxy device via a foreground application programming interface of an operating system executing on the computing device, and transmitting, by the data proxy device, the first request to an enterprise resource device. The steps may include generating, by the data proxy device, a ticketed URL, the ticketed URL being associated with resource device communications related to the first request for the enterprise resource, transmitting, by the data proxy device, the ticketed URL to the enterprise framework device, transmitting, by the enterprise framework device, the ticketed URL to the operating system, and receiving, by the data proxy device from the operating system, a second request addressed to the ticketed URL. The steps may include transmitting, by the data proxy device to the operating system, based on the second request addressed to the ticketed URL, a resource device response related to the first request for the enterprise resource device, retrieving, by the enterprise framework device from the operating system, the resource device response related to the first request for the enterprise resource, and transmitting, by the enterprise framework device to the application, the resource device response related to the first request for the enterprise resource.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
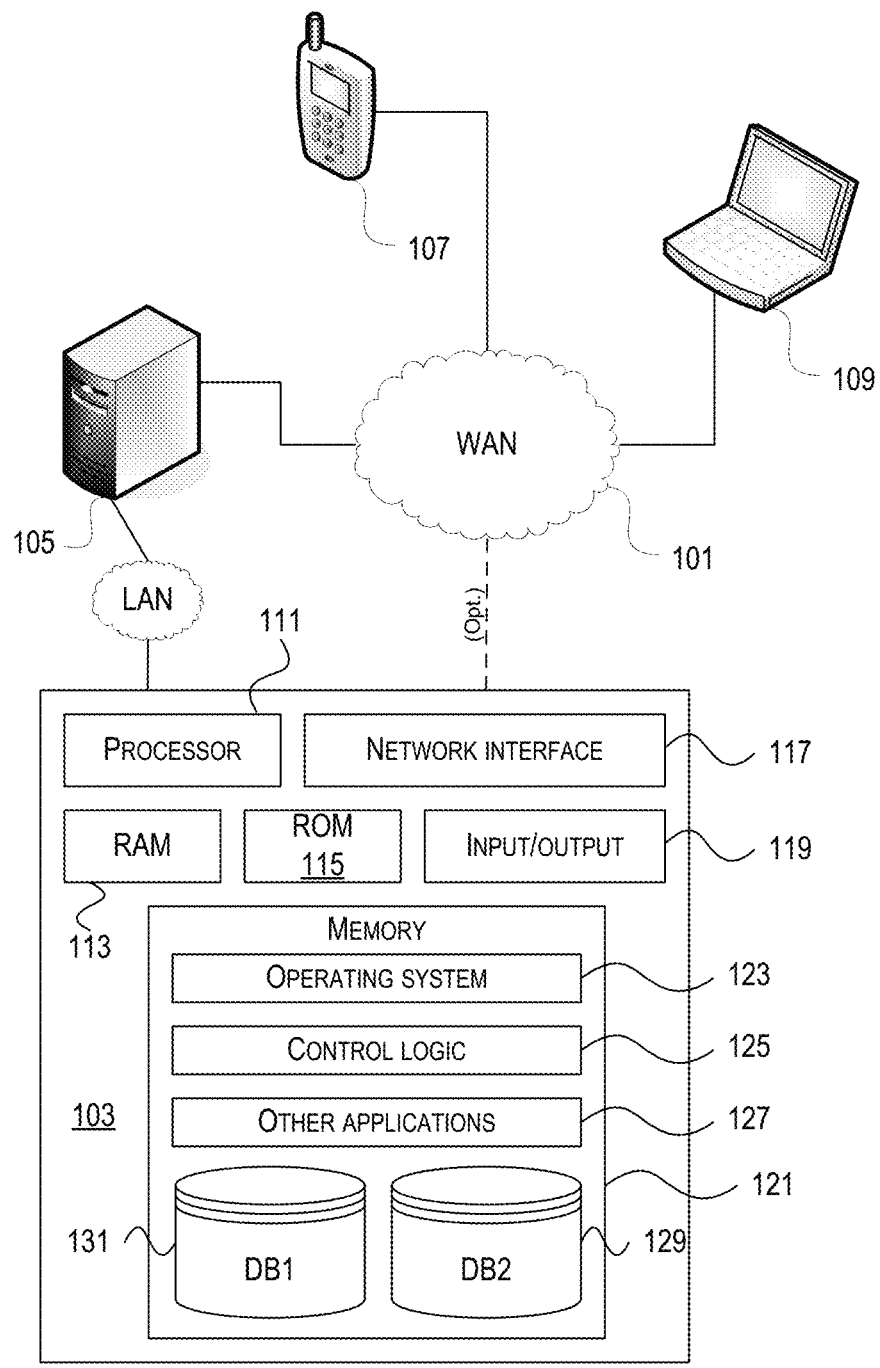
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
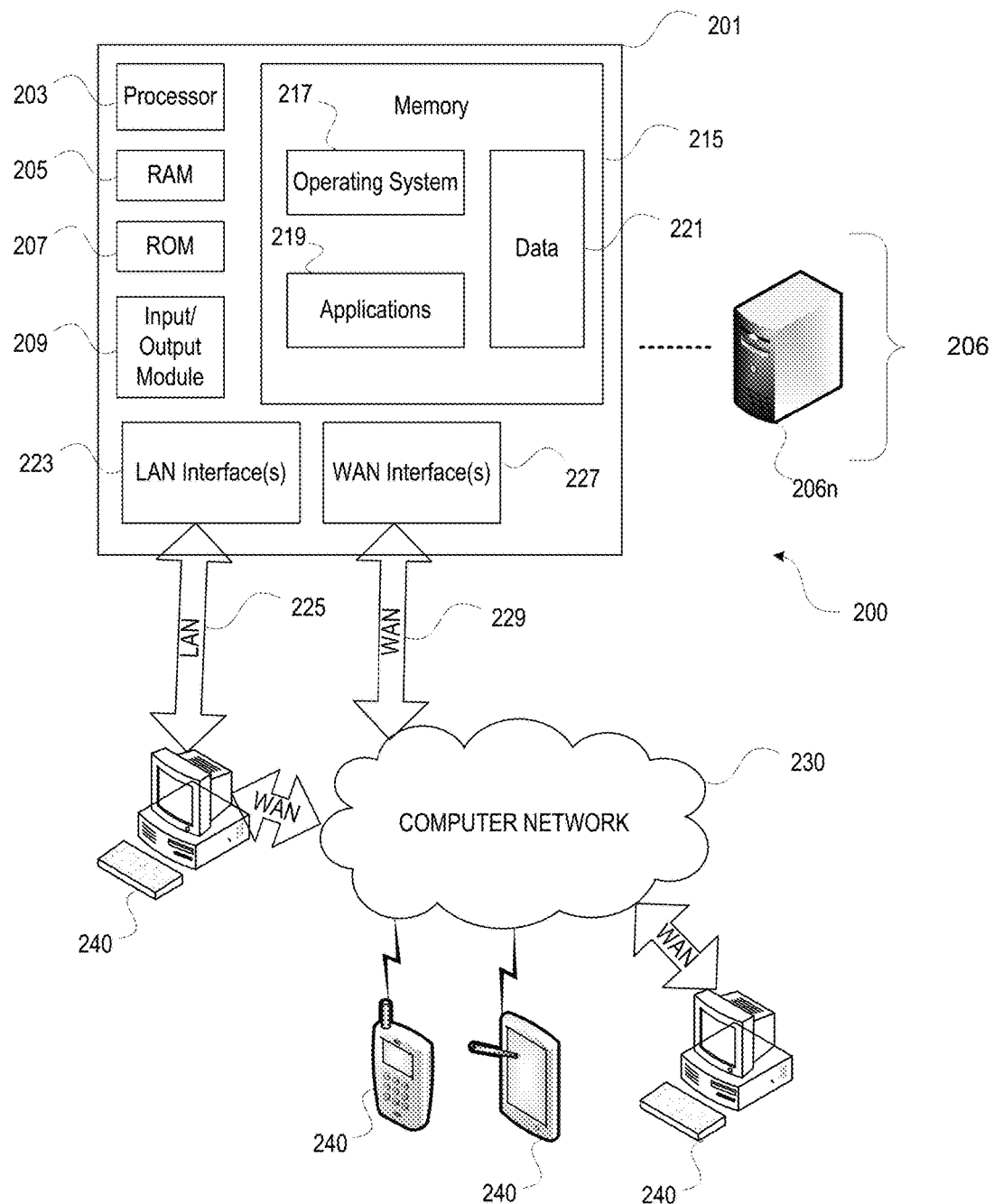
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
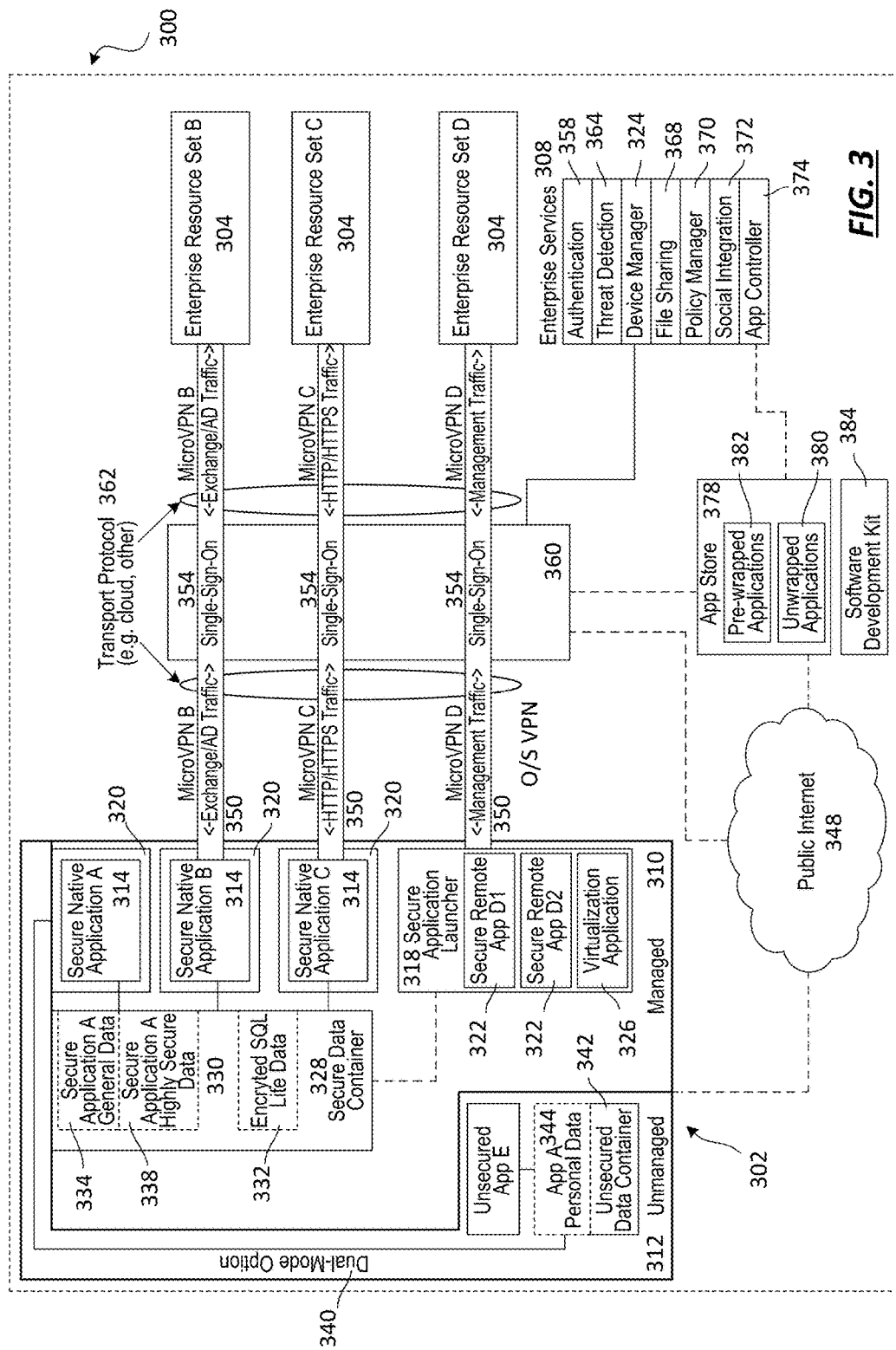
FIG. 3 depicts an illustrative enterprise mobility management system.

FIG. 3 represents an enterprise mobility technical architecture 300 for use in a BYOD environment. The architecture enables a user of a client device (e.g., mobile device)

302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 580, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
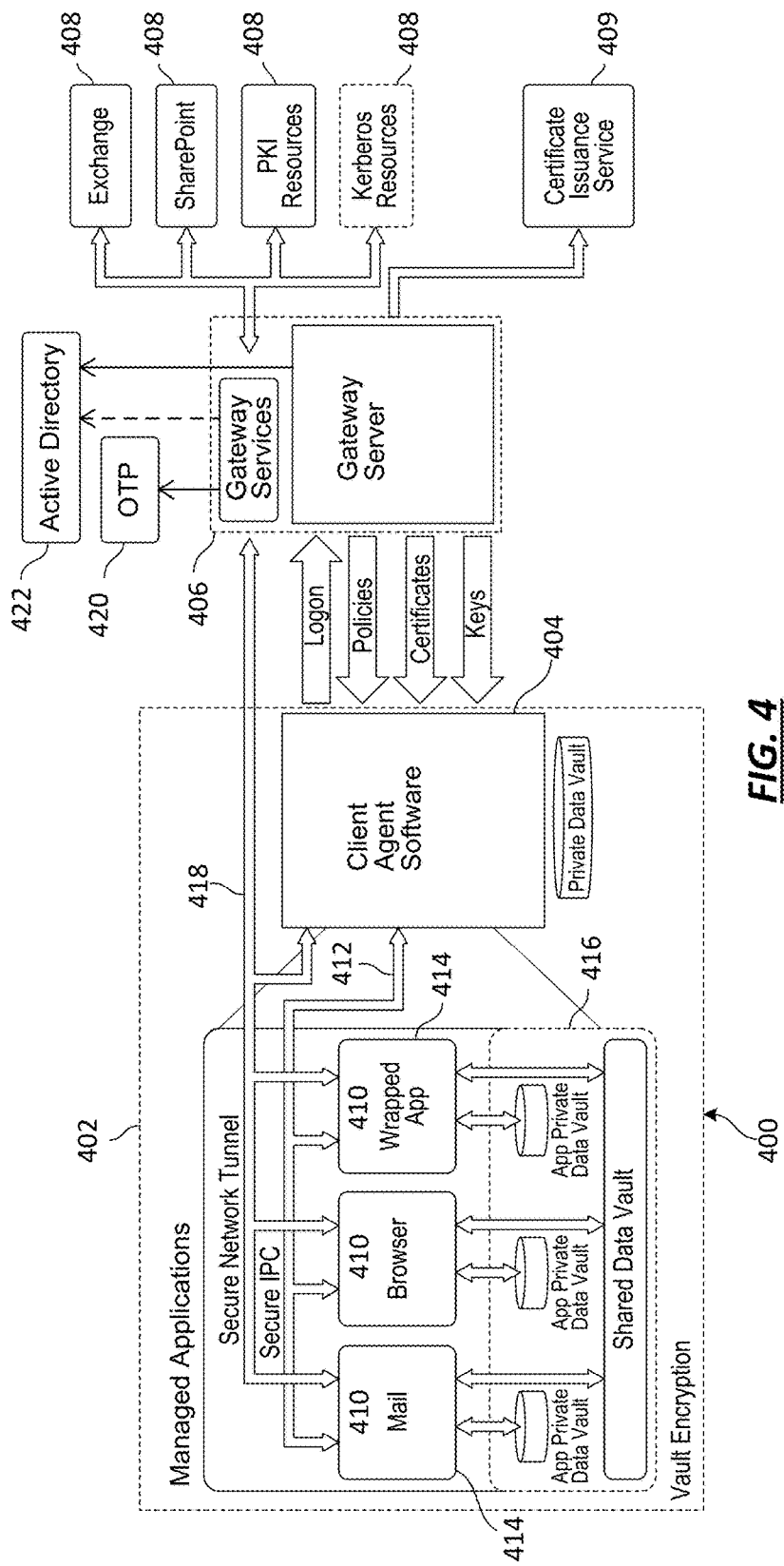
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 609 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do a full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiments

Operating systems (e.g., mobile device operating systems such as iOS, Android, Windows 8 Phone) may make provisions for applications to delegate or offload certain types of network activity to the operating system to, for example, improve battery life of a mobile device. Operating system managed network IO (e.g., background downloads) may be more efficient for battery use, as the operating system can avoid multiple applications running independently in the background and also avoid turning on the radio frequently for these applications. According to some aspects, the operating system may manage this activity efficiently for multiple applications at the same time using an application programming interface (API), which may be associated with a particular operating system. For example, the NSURLSession API for iOS may accept from an application an HTTP or HTTPS request that the application may wish to perform. The request (e.g., a resource polling request) may be passed to a system process that may schedule the IO efficiently and may react when the IO is completed.

More and more applications are beginning to support this delegated network IO model which may improve performance of the operating system and mobile device. Operating Systems and applications are presently trending towards performing IO in this manner.

According to some embodiments, applications managed by an enterprise mobile application management (MAM) system (e.g., managed applications) may require extra security protection for network activity. For these managed applications, there may also be a requirement to provide access to enterprise network resources that might not be visible to the public internet. This protection may include a selective VPN mechanism that may expose private enterprise resources to trusted/managed applications after the applications are appropriately authenticated on the enterprise. This enterprise authentication may provide extra protection of data in transit between the application and enterprise. According to some aspects, the VPN mechanism or the application management framework may provide various authentication capabilities (e.g., single sign-on (SSO), etc.) that may be used to enable transparent authentication to enterprise resources. The resource authentication may comprise various protocols and methods, such as HTTP Basic, Digest or NTLM, to Kerberos or client certificate authentication over SSL/TLS.

The combination of IO delegation to the operating system and access to protected resources may provide challenges to MAM implementations. For example, the operating system API may expect a directly addressable URL and be able to access the necessary credentials (e.g., a client certificate) from standard locations (e.g., the iOS keychain). However, the security provided by the operating system for operating system mechanisms might not be fully secure. Accordingly, MAM frameworks may provide extra encryption both to data that is at rest and to data that is in transit to which the operating system might not be a party.

Additionally, enterprise sources might not be directly addressable by applications, but may be accessible via a corporate VPN system with strong authentication. In such situations MAM users/devices might not be able to use the system level VPN capabilities that may be available to many mobile devices because this may open the network to all applications (not just the managed applications) or may require device management.

Accordingly, aspects of the present disclosure address enabling and securing enterprise network resource access delegated to the operating system by a MAM protected application. Disclosed aspects may be implemented by using a combination of techniques to provide specially constructed URLs to the operating system APIs for delegated IO that may allow the network connection to reach the intended enterprise resource (e.g., routing), to authenticate transparently (e.g., by SSO), and to protect the received data that may have been cached by the operating system (e.g., in an exposed fashion, such as by writing to a temporary disk file) before being provided to the application (e.g., using encryption). Disclosed aspects may coordinate an enterprise (MAM) framework with an intelligent data proxy server to allow the proxy to authenticate on the MAM framework's behalf to resources before handing off the IO request to the operating system. Disclosed aspects additionally encrypt (e.g., beyond just SSL) the returned data that is ready for the enterprise framework to decrypt later when the application is activated/woken.

Disclosed aspects include having the MAM framework intercept network API calls made by the application and then generate a one-shot URL, which can then be provided safely to the operating system. In this situation, an authentication connection may already exist between the MAM framework and the VPN, or a gateway server (e.g., proxy server) may provide access to enterprise resources. According to some aspects, the MAM framework may request that the gateway server issue a temporary one-shot URL. According to some aspects, this one-shot URL may contain a long secure random number or ticket. This ticket may be linked to the proper validated session and may enable routing directly to the resource.

According to some aspects, the gateway server (e.g., depending on the nature of the authentication required by the resource) may provide SSO (e.g., with no further assistance) based on credentials that may be cached in the original session or in a pre-defined trust relationship with the resource, such as by Kerberos Constrained Delegation permissions. To provide an independent encryption layer for the data being sent and received, a transaction key (or set of keys) may be negotiated to provide such orchestration. Accordingly, the MAM framework may encrypt any data (such as attachments) that are to be uploaded before passing the data to the operating system. Additionally, the gateway server may decrypt this data before sending the data to the enterprise resource. Response data transmitted by the enterprise resource may then be encrypted with the transaction key and may be safely cached by the operating system. The application may then be activated (e.g., woken up) to decrypt and process this received data. According to some aspects, the data proxy server 530 may have access to enterprise credentials that might not have been mediated by the enterprise framework 520, such as in the case of a user credential service that may generate credentials (e.g., virtual smart cards) that can be accessed by authorized data proxies. In such cases, the enterprise framework 520 may support credentials that the operating system 550 might not understand or be familiar (e.g., by adding code that may interface with customer hardware like smart card readers, etc.). These credentials may be specialized enterprise credentials. Disclosed embodiments may also support new authentication protocols, such as FIDO, and also support extensions to OAuth that may layer over HTTP in different or more complex ways than the authentication methods supported directly by the operation system 550.

According to some aspects, an example data sequence may include a protected application invoking a standard operating API for delegated TO, such as NSURLSession, to access an enterprise resource server protected by a data proxy (e.g., VPN gateway or reverse web proxy). The enterprise framework (e.g., MDX) may intercept the API and negotiate a request URL for this transaction with the data proxy. This process may include triggering MicroVPN login, generating/negotiating a transaction data encryption key (enterprise framework may persist in local secrets vault), encrypting request data (e.g., if request may upload sensitive data such as a file), submitting the request using foreground IO (which may ensure the data proxy is authenticated to resource server), obtaining a ticketed URL associated with the resource request (such that the data proxy can stream the encrypted response to the operating system), and passing the ticketed URL to the operating system API for background IO. According to some aspects, the application can go to sleep (e.g., not be active). The operating system may then handle the IO (e.g., buffering the response from the resource server that may be encrypted by the data proxy). According to some aspects, after IO completes, the protected application may be woken (e.g., by a user or by the operating system). The operating may then report the IO competition to the application. The enterprise framework may then intercept the IO completion notification, recover the transaction key, decrypt the buffered data, and return the response to the application. According to some aspects, there may be the HTTP level response from the resource server if the data proxy can authenticate to the resource server directly.

Figure 5:
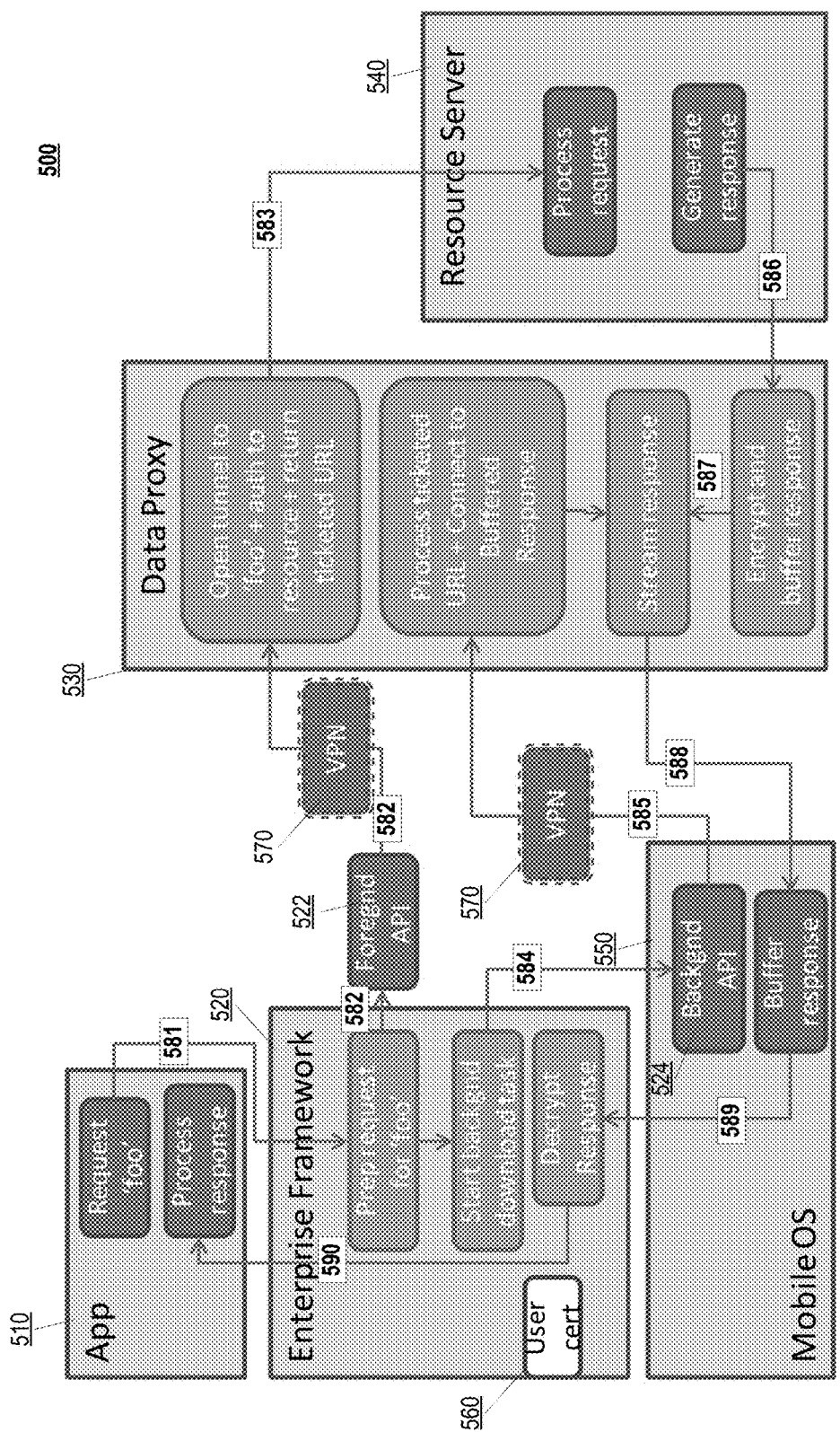
FIG. 5 depicts an illustrative flow diagram system showing an example system in accordance with one or more features described herein.

FIG. 5 illustrates an example system diagram 500 illustrating a process flow in accordance with one or more features described herein. In one or more embodiments, the process flow illustrated in FIG. 5 and/or one or more steps thereof may be performed by any device or combination of devices or components of FIGS. 1-4. In one or more embodiments, the process flow illustrated in FIG. 5 and/or one or more steps thereof may be embodied in computer-executable instructions that are stored in a computer-readable medium, such as a non-transitory computer-readable memory. System 500 may include a managed application 510 (which may be implemented on a computing device or user device, which may be similar to or instead be terminal 240 or enrolled mobile device 402), an enterprise framework 520 (e.g., similar to or instead be the framework shown in FIGS. 3 and 4), an operating system 550 (e.g., Windows, Android, iOS, etc.), a data proxy 530 (e.g., similar to or instead be the gateway(s) shown in FIGS. 3 and 4), and a resource server 540 (e.g., similar to or instead be one or more resources/servers shown in FIGS. 3 and 4). According to some embodiments, the managed application 510, the enterprise framework 520, and the operating system 550 may execute on and/or may be located on a client device (e.g., mobile device, user device, etc.). According to some embodiments, the data proxy 530 and the resource server 540 may be part of an enterprise system. Any steps disclosed in (or associated with) FIG. 5 may be omitted, be performed in other than the recited order, repeated, and/or combined. Any information from the steps disclosed in (or associated with) FIG. 5 may be combined with any of the information from the steps disclosed in (or associated with) FIG. 6 (discussed below).

According to some aspects, one or more of the steps of FIG. 5 may relate to VPN encapsulation situations, such as where the data proxy 530 might not be able to access/see inside the encryption layer negotiated between the enterprise framework 520 and the resource server 540. According to some aspects, this may allow the enterprise framework 520 to do foreground authentication to the resource server 540, and the data proxy 530 may then spool (some or all of) the encrypted response records over the background channel 524. In some aspects, the data proxy 530 may spool the bulk of the request body (e.g., for a file upload) over the background channel 524, such as when the basic request may be separated from the request body, which may ensure authentication has finished before switching to the background channel 524. Such a situation may occur with HTTP requests that may use headers for authentication aspects. According to some aspects, the data proxy 530 may use assistance from the enterprise framework 520 to determine when to switch over from the foreground to the background channel 524.

At step 581, the managed application 510 may request an enterprise resource (e.g., "foo"). This request may be a normal application call, such as a call for the foo resource, to an operating system API, such as NSURLSession API, etc. The enterprise framework 520 may then intercept this application API call.

At step 582, the enterprise framework 520 may prepare the request for the resource server and route the request to the data proxy 530 via a foreground IO (e.g., foreground API 522 or channel 522), which in some embodiments may be part of the enterprise framework 520. The enterprise framework 520 may route the request in this manner so that the enterprise framework 520 can use user credentials 560 (e.g., a user certificate 560 for SSL/TLS authentication or a password) without revealing the user credentials to the operating system 550. This may provide for extra security. The data proxy 530 may then negotiate a transaction/encryption key with the enterprise framework 520. According to some aspects, the enterprise framework 520 may support credentials or authentication protocols that the operation system 550 might not understand or recognize.

In one example, data communication between the components of FIG. 5 (e.g., between the enterprise framework 520 and the data proxy 530) may be in the form of Transport Layer Security (TLS) records. In such cases, at step 582, TLS handshake records may be exchanged between the enterprise framework 520 and the resource server 540 for authentication of the enterprise framework 520 and the resource server 540, and to establish an encryption layer. For example, this exchange may happen inside of an optional VPN encapsulation layer (e.g., via a VPN client function 570) processed by the data proxy 530. In such embodiments, the VPN client function 570 may execute on a client device and may be part of the enterprise framework 520, or the VPN client function 570 may be separate from the enterprise framework 520, such as the separate VPN client function 570 being or comprising a separate application 570 or a separate component 570. For example, the VPN application 570 or component 570 may still be associated with the enterprise framework 520 and may be trusted to access the enterprise credentials as well as may be able to understand the credentials if the credentials are specialized. Such embodiments may act as a network tunnel by dealing with raw IP packets or TCP/UDP sockets. In some cases, one of or both of the levels may be too low to see into the application requests when the application is using HTTPS. In such situation, the interactions that may be used in the background IO may be performed inside of the managed application 510 by the enterprise framework 520. The enterprise framework 520 may still interact with the data proxy 530 for the encryption and/or authentication negotiation to get a ticketed URL that may be handed-off to the operating system 550 for background processing (discussed below in more detail). In some embodiments, the VPN client function 570 may comprise a VPN server 570, which may be part of the data proxy 530 or may be a separate device or component. For example, the VPN server 570 may be hosted on the same physical machine or virtual machine as the data proxy 530, but may operate via distinct network functions.

The enterprise framework 520 may transmit one or more TLS data records, which may contain the application 510's resource access request (e.g., "get foo"), over the foreground channel 522 to the data proxy 530. According to some aspects, the resource server 540 may need to receive at least part of the resource access request (e.g. the HTTP headers) before it fully determines the authentication requirements. For example, the resource server 540 may use TLS renegotiation to request a client certificate after parsing the resource access request, in order to apply a granular access policy. According to some aspects, the enterprise framework 520 may know the full application request (e.g., the HTTP headers and body) and may signal to the data proxy 530 that the relevant sections of the request may have been sent even though these relevant sections may be encrypted such that the data proxy 530 might not be able to parse the relevant sections. The enterprise framework 520 may also modify the application request to identify communication boundaries by the data proxy 530. For example, the enterprise framework 520 may modify headers on the HTTP request to signal that the resource server 540 should close the connection when the HTTP response is complete. This may allow the data proxy 530 to determine when the response is complete even though the data proxy 530 might not be able to directly parse the response. Alternatively or additionally, the data proxy 530 may use a heuristic (such as timing measurements) to determine when the response from the resource server 540 may be complete or stalled. Using the heuristic may allow the background IO operation to be signaled as complete, and which may then allow the enterprise framework 520 to be woken to assess the true status of the request/response. The timing conditions for such a heuristic may be communicated to the data proxy 530 via the enterprise framework 520. According to some aspects, resource requests may be of a form that can be broken into multiple background IO steps by the enterprise framework 520, such as by specifying byte ranges for file downloads, which may include repeating one or more of the steps of FIG. 5 before completion may be reported to the managed application 510.

At step 583, the data proxy 530 may open a secure tunnel to the resource server (e.g., to foo), facilitate authentication to the resource server 540 (e.g. using user credentials), and return a ticketed URL to the enterprise framework 520. According to some aspects, the data proxy 530 may forward the foo request to the resource server 540, which may allow at least a TLS level of request to be completed in the foreground end-to end from the enterprise framework 520. This may be the case if a user certificate 560 is required. The data proxy 530 may then generate a ticketed URL that may reference the resource server response. For example, the URL may contain a secure ticket with, for example, a short time limit or one-time use limit, that may serve as a link for the operating system 550 background download. The ticket may be combined with other credentials, such as a session cookie, password, or certificate. Data proxy 530 may generate a new session cookie for the background IO operation. The data proxy 530 may then pass the ticketed URL back to the enterprise framework 520.

At step 584, the enterprise framework 520 may initiate a background download task by passing the ticketed URL to the operating system 550 (e.g., via a background API 524). While in some aspects, the enterprise framework 520 may pass a secure ticket (e.g., random and/or unguessable number), in other aspects, the enterprise framework 520 may provide additional credentials, such as an alternative certificate, password, or cookie, which the operating system 550 may be permitted to access to supplement the secure ticket. For example, the enterprise framework 520 may use a request ID combined with alternative credentials, such as a session cookie, certificate, password, etc. The background API 524 may be configured to handle retrieving responses transmitted by the resource server 540. This retrieval may be performed in the operating system background after the data proxy 530 has encrypted the response.

While in some aspects, the enterprise framework 520 may pass a ticketed URL, in other aspects, the enterprise framework 520 may provide additional credentials, such as an alternative certificate, password, or cookie, which the operating system 550 may be permitted to access to supplement the secure ticket. For example, the enterprise framework 520 may use a request ID combined with alternative credentials, such as a session cookie, certificate, password, etc.

At step 585, the operating system 550 may initiate data retrieval/fetch in the background outside of the protected application space. The operating system 550 may then prepare to buffer response data in potentially insecure areas of the operating system 550 (e.g., in a temporary file persisted on the disk). Data proxy 530 may receive this data retrieval request transmitted by the operating system 550 and may validate the ticket and any other credentials associated with the request. Data proxy 530 may recover the resource request context established during the foreground IO operation. Data proxy 530 may associate the data retrieval request with the response from the resource server 540, including any response data that may have been buffered before the data retrieval request was received.

At step 586, resource server 540 may respond to the request forwarded by the data proxy 530 by generating a response (e.g., access to the requested resource "foo"). The response may be transmitted to the data proxy 530.

At step 587, the data proxy 530 may buffer any response data until the data proxy 530 can coordinate with the operating system data fetch request (e.g., from step 5).

At step 588, the data proxy 530 may encrypt any response data and may send or stream the encrypted data to the operating system 550. According to some aspects, this data may be streamed in chunks. For example, the data proxy 530 may stream to the operating system 550 TLS data records containing the resource server 540's response. In such a case, the TLS data records may be or might not be encrypted by the data proxy 530 at step 588, because the TLS data records may already be encrypted. According to some aspects, the data proxy 530 may signal response completion to the operating system 550 when the resource request response is complete or alternatively has reached an arranged communication boundary. For example, the communication boundary may be detected using heuristics, such as timing measurements, or may be based on the size of the response or other characteristics. The communication boundary may be such that the resource access request can be repeated, resumed, or converted into multiple partial requests (e.g., when specific byte ranges of a file can be requested). The operating system 550 may then finish the encrypted data response download and may store the data as a temporary file in an insecure area.

At step 589, the operating system 550 may transmit a signal to the enterprise framework 520 that the transaction is complete, and may transmit the response to the enterprise framework 520.

At step 590, the enterprise framework 520 may decrypt the response (e.g., using the negotiated key), and may signal the application that the transaction is complete. The enterprise framework 520 may then transmit the decrypted response to the application 510. The process flow may then end, or alternatively may end after any step described in regard to FIG. 5. Alternatively, the enterprise framework 520 may detect that the resource access request might not have been completely fulfilled and may repeat any of the steps of FIG. 5 in order to repeat or resume the original resource request from the application 510, or continue with subsequent partial requests. For example the enterprise framework 520 may request download of a particular byte range of a file, or may respond to an additional authentication request that might not have been anticipated during the initial foreground IO operation.

Figure 6:
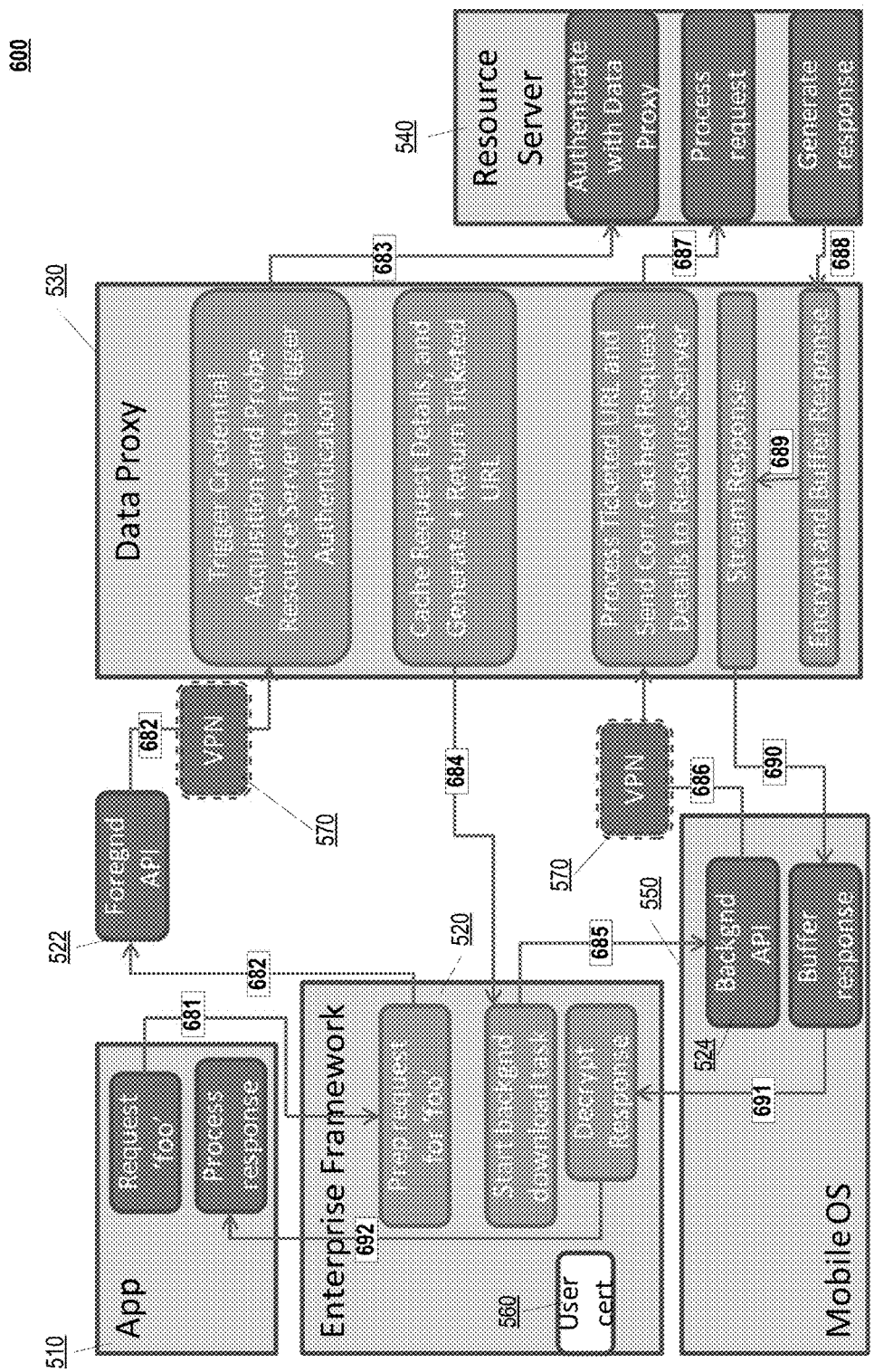
FIG. 6 depicts an illustrative flow diagram system showing an example system in accordance with one or more features described herein.

FIG. 6 illustrates an example system diagram 600 illustrating a process flow in accordance with one or more features described herein. In one or more embodiments, the process flow illustrated in FIG. 6 and/or one or more steps thereof may be performed by any device or combination of devices or components of FIGS. 1-5. In one or more embodiments, the process flow illustrated in FIG. 6 and/or one or more steps thereof may be embodied in computer-executable instructions that are stored in a computer-readable medium, such as a non-transitory computer-readable memory. System 600 may include managed application 510 (which may be implemented on a computing device or user device, which may be similar to or instead be terminal 240 or enrolled mobile device 402), enterprise framework 520 (e.g., similar to or instead be the framework shown in FIGS. 3 and 4), operating system 550 (e.g., Windows, Android, iOS, etc.), data proxy 530 (e.g., similar to or instead be the gateway(s) shown in FIGS. 3 and 4), and resource server 540 (e.g., similar to or instead be one or more resources/servers shown in FIGS. 3 and 4). Any steps disclosed in (or associated with) FIG. 6 may be omitted, be performed in other than the recited order, repeated, and/or combined. Any information from the steps disclosed in (or associated with) FIG. 6 may be combined with any of the information from the steps disclosed in (or associated with) FIG. 5.

According to some aspects, one or more of the steps of FIG. 6 may relate to a reverse proxy situation, such as where the data proxy 530 may be able to access/see the application 510's resource request and may be able to authenticate to the resource server 540 during the background IO operation. Additionally or alternatively, the data proxy 530 may be able to cache the resource request.

At step 681, the managed application 510 may request an enterprise resource (e.g., "foo"). This request may be a normal application call, such as a call for the foo resource, to an operating system API, such as NSURLSession API, etc. The enterprise framework 520 may then intercept this application API call.

At step 682, the enterprise framework 520 may prepare the request for the resource server 540 and route the request to the data proxy 530 via a foreground IO (e.g., foreground API 522 or channel 522), which in some embodiments may be part of the enterprise framework 520. In one example, data communication between the components of FIG. 6 (e.g., between the enterprise framework 520 and the data proxy 530) may be in the form of Transport Layer Security (TLS) records. In such cases, at step 682, TLS handshake records may be exchanged between the enterprise framework 520 and the resource server 540 for authentication of the enterprise framework 520 and the resource server 540, and to establish an encryption layer. For example, this exchange may happen inside of an optional VPN encapsulation layer (e.g., via a VPN client function 570) processed by the data proxy 530. In such embodiments, the VPN client function 570 may execute on a client device and may be part of the enterprise framework 520, or the VPN client function 570 may be separate from the enterprise framework 520, such as the separate VPN client function 570 being or comprising a separate application 570 or a separate component 570. For example, the VPN application 570 or component 570 may still be associated with the enterprise framework 520 and may be trusted to access the enterprise credentials as well as may be able to understand the credentials if the credentials are specialized. Such embodiments may act as a network tunnel by dealing with raw IP packets or TCP/UDP sockets. In some cases, one of or both of the levels may be too low to see into the application requests when the application is using HTTPS. In such situation, the interactions that may be used in the background IO may be performed inside of the managed application 510 by the enterprise framework 520. The enterprise framework 520 may still interact with the data proxy 530 for the encryption and/or authentication negotiation to get a ticketed URL that may be handed-off to the operating system 550 for background processing (discussed below in more detail). In some embodiments, the VPN client function 570 may comprise a VPN server 570, which may be part of the data proxy 530 or may be a separate device or component. For example, the VPN server 570 may be hosted on the same physical machine or virtual machine as the data proxy 530, but may operate via distinct network functions.

The enterprise framework 520 may route the request in this manner so that the enterprise framework 520 can use user credentials 560 (e.g., a user certificate 560 for SSL/TLS authentication or a password) without revealing the user credentials to the operating system 550. This may provide for extra security. The data proxy 530 may then negotiate a transaction/encryption key with the enterprise framework 520. According to some aspects, the enterprise framework 520 may support credentials or authentication protocols that the operation system 550 might not understand or recognize.

In one example, data communication between the components of FIG. 6 (e.g., between the enterprise framework 520 and the data proxy 530) may be in the form of Transport Layer Security (TLS) records. The enterprise framework 520 may transmit one or more TLS data records, which may contain the application 510's resource access request (e.g., "get foo"), over the foreground channel 522 to the data proxy 530. The data proxy 530 may then cache these request details and the resource request context until the background IO request for the ticketed URL is received by the data proxy 530 (which will be discussed further below).

At step 683, data proxy 530 may determine whether the data proxy 530 has obtained (or has locally stored) the correct credentials to handle authentication challenges presented by the resource server 540, and may initiate a credential acquisition session. For example, the data proxy 530 may need or request that the enterprise framework 520 perform one or more client certificate operations in order to obtain a Kerberos Ticket Granting Ticket (TGT) (or other user credential information) for the user or user device. According to some aspects, this authentication process may happen earlier in the process, such as during step 682, or later in the process, such as at step 684. For example, during SSL/TLS authentication of a client certificate, the resource server authentication may occur in the foreground. According to some aspects, the data proxy 530 may use cached credentials to handle authentication challenges (e.g., a cached password to obtain a Kerberos TGT). After obtaining the correct user credential information, such as the TGT, the data proxy 530 may be configured to handle (e.g., solely handle) authentication challenges (such as a Kerberos challenge) presented by the resource server 540. According to some aspects, the data proxy 530 may probe the resource server 540 to trigger an authentication session. For example, the data proxy 530 may use an HTTP HEAD request. The data proxy 530 may then transmit the authentication credentials to the resource server 540 (e.g., via an authentication session).

At step 684, the data proxy 530 may cache the request details for resource "foo" transmitted by enterprise framework 520 and intended for the resource server 540. The data proxy 530 may then generate a ticketed URL that may reference the cached request details and the associated request context established during the foreground IO operation in step 682, including the context for authentication based on user credentials made available by the enterprise framework 520. The data proxy 530 may then pass the ticketed URL back to the enterprise framework 520. For example, the URL may contain a secure ticket with, for example, a short time limit or one-time use limit, that may serve as a trigger to send the cached request details to the resource server 540. Thus, after the data proxy receives the URL from the background API 524 of the operating system 550 (discussed below in steps 684-687), the data proxy 530 may forward the request details for the resource "foo" to the resource server 540 using the request context established in step 682.

At step 685, the enterprise framework 520 may initiate a background download task by passing the ticketed URL to the operating system 550 (e.g., via a background API 524). While in some aspects, the enterprise framework 520 may pass a secure ticket (e.g., random and/or unguessable number), in other aspects, the enterprise framework 520 may, the enterprise framework 520 may provide additional credentials, such as an alternative certificate, password, or cookie, which the operating system 550 may be permitted to access to supplement the secure ticket. For example, the enterprise framework 520 may use a request ID combined with alternative credentials, such as a session cookie, certificate, password, etc. The background API 524 may be configured to handle retrieving responses transmitted by the resource server 540. This retrieval may be performed in the operating system background after the data proxy 530 has encrypted the response.

At step 686, the operating system 550 may initiate data retrieval/fetch in the background outside of the protected application space. The operating system 550 may then prepare to buffer response data in potentially insecure areas of the operating system 550 (e.g., in a temporary file persisted on the disk). Data proxy 530 may receive this data retrieval request transmitted by the operating system 550 and may validate the ticket and any other credentials associated with the request. Data proxy 530 may recover the resource request context established during the foreground IO operation.

At step 687, the data proxy 530 may forward the cached resource request to the resource server 540 using the associated resource request context, and the resource server 540 may process this request.

At step 688, resource server 540 may respond to the request forwarded by the data proxy 530 by generating a response (e.g., access to the requested resource "foo"). The response may be transmitted to the data proxy 530.

At step 689, the data proxy 530 may buffer any response data until the data proxy 530 can coordinate with the operating system data fetch request.

At step 690, the data proxy 530 may encrypt any response data and may send or stream the encrypted data to the operating system 550. According to some aspects, this data may be streamed in chunks. For example, the data proxy 530 may stream to the operating system 530 TLS data records containing the resource server 540's response. In such a case, the TLS data records may be or might not be encrypted by the data proxy 530 at step 690, because the TLS data records may already be encrypted. The operating system 550 may then finish the encrypted data response download and may store the data as a temporary file in an insecure area.

At step 691, the operating system 550 may transmit a signal to the enterprise framework 520 that the transaction is complete, and may transmit the response to the enterprise framework 520.

At step 692, the enterprise framework 520 may decrypt the response (e.g., using the negotiated key), and may signal the application that the transaction is complete. The enterprise framework 520 may then transmit the descripted response to the application 510. The process flow may then end, or alternatively may end after any step described in regard to FIG. 6. Alternatively, the enterprise framework 520 may detect that the resource access request might not have been completely fulfilled and may repeat any of the steps of FIG. 6 in order to repeat or resume the original resource request from the application 510, or may continue with subsequent partial requests. For example the enterprise framework 520 may request download of a particular byte range of a file, or may respond to an additional authentication request that might not have been anticipated during the initial foreground IO operation.

According to some aspects, the process of the Data Proxy 530 returning a ticketed URL to reference the response (which the enterprise framework 520 may hand to the operating system 550 to fetch in background) and the process of Resource Server 540 returning the response to the Data Proxy 530 may be asynchronous. In such situations, it may be required that the Data Proxy 530 be prepared to buffer some or all of the response data until the operating system 550 calls in to fetch the data. Alternatively or additionally, it may be required that the Data Proxy 530 be prepared to block the operating system call until the Resource Server 540 generates and/or finishes the response. In this situation, this could be much later if, for example, this is a "long poll" type of call to request data that may appear in the future. According to some aspects, the operating system 550 may repeat the ticketed URL request if the first request times out without a response from the data proxy 530. This could happen, for example, automatically or with prompting from the enterprise framework 520.

According to some aspects, the user certificate 560 may be used during steps 582-583 or 682-683 if needed. In these situations, the user certificate authentication to the resource server may happen before the ticketed URL is returned. According to some aspects, other authentication methods, such as HTTP Basic, NTLM, Negotiate, form fill or SAML, may be performed by the Data Proxy 530 without client assistance. This may happen asynchronously to the ticketed URL being returned. In such situations, the HTTP request headers may be sent before the ticketed URL is returned.

According to some aspects, if the resource server requires the client certificate for HTTPS, the enterprise framework 520 can cooperate with the data proxy 530 as the data proxy 530 opens the HTTPS session to the resource server 540, using, for example, a delegated certificate authentication to proxy. According to some aspects, the enterprise framework 520 can start HTTPS with the client certificate via a VPN tunnel. In such situations, the enterprise framework 520 may then send the request immediately and may have the data proxy 530 create a ticketed URL to retrieve the response.

According to some aspects, the buffered response from the operating system 550 may be the remainder of the end-to-end TLS traffic flow. In such situations, the enterprise framework 520 may be required to keep the TLS session context for the end to end flow, and may use this to process the buffered TLS connection bytes or records.

According to some aspects, if the application request in step 581 or in step 681 comprises a file upload, the HTTP request body containing the encrypted file may be sent, for example, in steps 584-585 or in steps 685-686 (which may allow the operating system to efficiently stream the encrypted file) with just the request headers being sent synchronously during, for example, steps 582-583 or steps 682-683. In this situation, the transaction key negotiation may supply the existing bulk encryption key for that file to the data proxy, so the operating system can just reference the already encrypted file in the background API call. According to some aspects, if uploading a file from a protected app which is already encrypted by the enterprise framework 520, the transaction key negotiation could send the data proxy the bulk encryption key used locally. This may avoid any decryption/re-encryption overhead for the upload.

According to some aspects, if the application request in step 581 or step 681 comprises a file download, the enterprise framework 520 may supply the desired bulk encryption key for that file to the data proxy 530. In this case, if the operating system 550 can spool the response directly to the desired file path in, for example, the managed application 510 sandbox, or if the temporary file created by the operating system 550 can be renamed to the desired file path after the download is complete, then no further processing may be needed, thus possibly avoiding any decryption/re-encryption overhead.

According to some aspects, with respect to TLS authentication, the enterprise framework 520 and the data proxy 530 may need to ensure correct handling of TLS alerts (and/or other messages which may occur during the TLS session). In such situations, a long stream of records may be handled by the operating system 550 (e.g., for bulk upload and/or download) without waking the enterprise network 520. According to some aspects, after the resource server 540 finishes sending the response back to the data proxy 530, the resource server 540 may leave the TLS connection open for further use (e.g., with a "keep alive" HTTP connection inside of the connection) and/or may close the TLS connection. If the resource server 540 leaves the TLS connection open, the data proxy 530 may, for example, determine whether there is a long enough gap (e.g., time duration and/or data received with less frequency) between data packets received from the resource server 540. If the data proxy 530 determines that the gap meets a threshold duration, then the data proxy 530 may determine that the resource server 540 has stopped transmitting the response. If, for example, the transmission of the response was not complete, the enterprise framework 520 may then trigger a subsequent (or the same) background IO to continue the download of the response. The enterprise framework 520 may also modify the application request to identify communication boundaries by the data proxy 530. For example, the enterprise framework 520 may modify headers on the HTTP request to signal that the resource server 540 should close the connection when the HTTP response is complete. This may allow the data proxy 530 to determine when the response is complete even though the data proxy 530 might not be able to directly parse the response. Alternatively or additionally, the data proxy 530 may use a heuristic (such as timing measurements) to determine when the response from the resource server 540 may be complete or stalled. Using the heuristic may allow the background IO operation to be signaled as complete, and which may then allow the enterprise framework 520 to be woken to assess the true status of the request/response. The timing conditions for such a heuristic may be communicated to the data proxy 530 via the enterprise framework 520. According to some aspects, resource requests may be of a form that can be broken into multiple background IO steps by the enterprise framework 520, such as by specifying byte ranges for file downloads.

If the resource server 540 closes the TLS connection, the resource server 540 may send a TLS close-notify message to the data proxy 530, and may be expecting a TLS close-notify message in response. According to some aspects, this may be needed in order to resume the TLS session on future requests. This message may be transmitted as a distinct TLS record. According to some aspects, the transmission of the TLS close-notify message may be followed by the closing of the TCP connection to the data proxy 530. The data proxy 530 may then transmit the TLS close-notify message to the operating system 550 in a similar fashion as other TLS records. The data proxy 530 may mark this point in the response as the completion of the OS background IO, which may then wake the enterprise framework 520 to process the TLS records that have been transmitted to the enterprise framework 520. The enterprise framework 520 may then transmit a final TLS close-notify message as a foreground IO to the data proxy 520, such as by using the ticketed URL from the background IO operation stage, which may then relay the TLS close-notify message to the resource server 540. According to some aspects, the enterprise framework 520 may use information previously received with the ticketed URL, such as information that may be used for this resumption behavior. The application 510 (e.g., the woken application 510) may then process the data passed via the enterprise framework 520.

According to some aspects, the TLS connection processing may need to wake the enterprise framework 520 more than once to perform some of the steps disclosed herein. In such situations, the enterprise framework 520 may resume the background IO handled by the operating system 550. For example, the resource server 540 may renegotiate the TLS encryption layer mid-stream, which may trigger the enterprise framework 520 to wake for each negotiation.

According to some aspects, disclosed embodiments may describe situations where the enterprise framework 520 may enable the data proxy 530 to authenticate to the resource server 540 during the foreground IO operation (e.g., using a client certificate via a certificate delegation mechanism). In such situations, the data proxy 530 may manage the encryption layer with the resource server 540 and the enterprise framework 520. In addition to the data proxy 530 spooling the encrypted response records from the resource server 540 over the background channel 524, the data proxy 530 may also be responsible for the data encryption conversion. This may allow the data proxy 530 to effectively determine when the response has completed, and may allow the data proxy 530 to perform other semantic functions, such as data manipulation, protocol conversion, etc.

As illustrated in the discussion above, various aspects described herein may be embodied in various forms. For instance, various aspects may be embodied in a method, in a computing device, in computer-executable instructions stored in a computer-readable medium, and/or in an apparatus.

In other examples, various aspects may be embodied in a computing device that includes at least one processor and memory storing computer-readable instructions that, when executed by the at least one processor, cause the computing device to perform any and/or all of the descriptions, steps, processes, and/or methods discussed herein. In still other examples, various aspects of the disclosure may be embodied in one or more computer-readable media (which may, e.g., include a non-transitory computer-readable memory) storing instructions that, when executed by at least one processor, cause the at least one processor to perform any and/or all of the descriptions, steps, processes, and/or methods discussed herein. In yet other examples, various aspects of the disclosure may be embodied in an apparatus comprising one or more means for performing any and/or all of the descriptions, steps, processes, and/or methods discussed herein.

What is claimed is:

1. A method comprising:

receiving, by an enterprise framework device and from an application executing on a computing device, a first request associated with accessing an enterprise resource;

transmitting, by the enterprise framework device, to a data proxy device, and via a foreground application programming interface of an operating system executing on the computing device, the first request, wherein the foreground application programming interface is different from the application;

transmitting, by the data proxy device, the first request to an enterprise resource device;

generating, by the data proxy device, a ticketed Uniform Resource Locator (URL), wherein the ticketed URL is associated with resource device communications related to the first request, and wherein the ticketed URL comprises at least one of a secure number, a use limit, or an access credential;

transmitting, by the data proxy device and via the enterprise framework device, the ticketed URL to the operating system;

receiving, by the data proxy device and from the operating system, a second request addressed to the ticketed URL;

transmitting, by the data proxy device, to the operating system, and based on the second request, a resource device response related to the first request for the enterprise resource device;

retrieving, by the enterprise framework device and from the operating system, the resource device response; and transmitting, by the enterprise framework device and to the application, the resource device response.

2. The method of claim 1, further comprising:

generating, by the enterprise framework device, an encryption key associated with the data proxy device;

encrypting, by the data proxy device and based on the encryption key, the resource device response; and decrypting, by the enterprise framework device and based on the encryption key, the encrypted resource device response.

3. The method of claim 1, further comprising:

receiving, by the data proxy device and from the enterprise framework device, the first request; and initiating, by the data proxy device and based on receiving the first request, an authentication session with the enterprise resource device using one or more credentials that are unfamiliar to the operating system.

4. The method of claim 1, further comprising:

caching, by the data proxy device and in a storage device, information associated with the first request, wherein the ticketed URL references a location of the cached information, and wherein the second request comprises the location of the cached information;

transmitting, by the data proxy device, to the enterprise resource device, and based on receiving the second request, the cached information associated with the first request; and receiving, by the data proxy device and from the enterprise resource device, the resource device response.

5. The method of claim 1, further comprising:

transmitting, by the data proxy device, to the enterprise resource device, via an authentication session, and based on receiving the second request, authentication credentials.

6. The method of claim 1, further comprising:

buffering, by the data proxy device, a portion of the resource device response;

receiving, by the data proxy device, a call from the operating system; and transmitting, by the data proxy device, to the operating system, and based on the call, the buffered portion of the resource device response.

7. The method of claim 1, wherein the first request comprises a request to download a file or upload a file.

8. A system, comprising:

at least one processor; and at least one memory storing computer-readable instructions that, when executed by the at least one processor, cause the system to:

receive, by an enterprise framework device and from an application executing on a computing device, a first request associated with accessing an enterprise resource;

transmit, by the enterprise framework device, to a data proxy device, and via a foreground application programming interface of an operating system executing on the computing device, the first request, wherein the foreground application programming interface is different from the application;

transmit, by the data proxy device, the first request to an enterprise resource device;

generate, by the data proxy device, a ticketed Uniform Resource Locator (URL), wherein the ticketed URL is associated with resource device communications related to the first request, and wherein the ticketed URL comprises at least one of a secure number, a use limit, or an access credential;

transmit, by the data proxy device and via the enterprise framework device, the ticketed URL to the operating system;

receive, by the data proxy device and from the operating system, a second request addressed to the ticketed URL;

transmit, by the data proxy device, to the operating system, and based on the second request, a resource device response related to the first request for the enterprise resource device;

retrieve, by the enterprise framework device and from the operating system, the resource device response; and transmit, by the enterprise framework device and to the application, the resource device response.

9. The system of claim 8, wherein the computer-readable instructions further cause the system to:

generate, by the enterprise framework device, an encryption key associated with the data proxy device;

encrypt, by the data proxy device and based on the encryption key, the resource device response; and decrypt, by the enterprise framework device and based on the encryption key, the encrypted resource device response.

10. The system of claim 8, wherein the computer-readable instructions further cause the system to:

receive, by the data proxy device from the enterprise framework device, the first request; and initiate, by the data proxy device and based on receiving the first request, an authentication session with the enterprise resource device using one or more credentials that are unfamiliar to the operating system.

11. The system of claim 8, wherein the computer-readable instructions further cause the system to:

cache, by the data proxy device and in a storage device, information associated with the first request, wherein the ticketed URL references a location of the cached information, and wherein the second request comprises the location of the cached information;

transmit, by the data proxy device, to the enterprise resource device, and based on receiving the second request, the cached information associated with the first request; and receive, by the data proxy device and from the enterprise resource device, the resource device response.

12. The system of claim 8, wherein the computer-readable instructions further cause the system to:

transmit, by the data proxy device, to the enterprise resource device, via an authentication session, and based on receiving the second request, authentication credentials.

13. The system of claim 8, wherein the computer-readable instructions further cause the system to:

buffer, by the data proxy device, a portion of the resource device response;

receive, by the data proxy device, a call from the operating system; and transmit, by the data proxy device, to the operating system, and based on the call, the buffered portion of the resource device response.

14. The system of claim 8, wherein the first request comprises a request to download a file or upload a file.

15. One or more non-transitory computer-readable storage media having computer-readable instructions stored thereon that, when executed by one or more processors, cause the one or more processors to:

receive, by an enterprise framework device and from an application executing on a computing device, a first request associated with accessing an enterprise resource;

transmit, by the enterprise framework device, to a data proxy device, and via a foreground application programming interface of an operating system executing on the computing device, the first request, wherein the foreground application programming interface is different from the application;

transmit, by the data proxy device, the first request to an enterprise resource device;

generate, by the data proxy device, a ticketed Uniform Resource Locator (URL), wherein the ticketed URL is associated with resource device communications related to the first request, and wherein the ticketed URL comprises at least one of a secure number, a use limit, and an access credential;

transmit, by the data proxy device and via the enterprise framework device, the ticketed URL to the operating system;

receive, by the data proxy device and from the operating system, a second request addressed to the ticketed URL;

transmit, by the data proxy device, to the operating system, and based on the second request, a resource device response related to the first request for the enterprise resource device;

retrieve, by the enterprise framework device and from the operating system, the resource device response; and transmit, by the enterprise framework device and to the application, the resource device response.

16. The non-transitory computer-readable storage media of claim 15, wherein the computer-readable instructions further cause the one or more processors to:

generate, by the enterprise framework device, an encryption key associated with the data proxy device;

encrypt, by the data proxy device and based on the encryption key, the resource device response; and decrypt, by the enterprise framework device and based on the encryption key, the encrypted resource device response.

17. The non-transitory computer-readable storage media of claim 15, wherein the computer-readable instructions further cause the one or more processors to:

receive, by the data proxy device from the enterprise framework device, the first request; and initiate, by the data proxy device and based on receiving the first request, an authentication session with the enterprise resource device using one or more credentials that are unfamiliar to the operating system.

18. The non-transitory computer-readable storage media of claim 15, wherein the computer-readable instructions further cause the one or more processors to:

cache, by the data proxy device and in a storage device, information associated with the first request, wherein the ticketed URL references a location of the cached information, and wherein the second request comprises the location of the cached information;

transmit, by the data proxy device, to the enterprise resource device, and based on receiving the second request, the cached information associated with the first request; and receive, by the data proxy device and from the enterprise resource device, the resource device response.

19. The non-transitory computer-readable storage media of claim 15, wherein the computer-readable instructions further cause the one or more processors to:

transmit, by the data proxy device, to the enterprise resource device, via an authentication session, and based on receiving the second request, authentication credentials.

20. The non-transitory computer-readable storage media of claim 15, wherein the computer-readable instructions further cause the one or more processors to:

buffer, by the data proxy device, a portion of the resource device response;

receive, by the data proxy device, a call from the operating system; and transmit, by the data proxy device, to the operating system, and based on the call, the buffered portion of the resource device response.

* * * * *